May 15, 1951     R. B. ROBERTS     2,552,739
METHOD OF TRACKING ROTOR BLADES
Filed Oct. 5, 1945
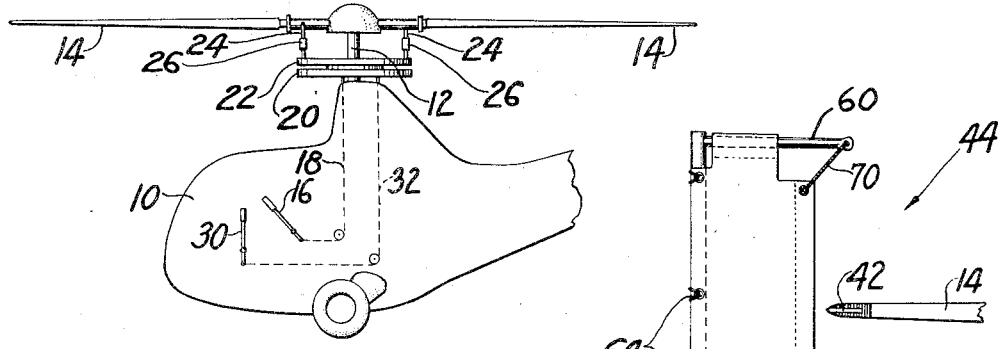
Fig. 1
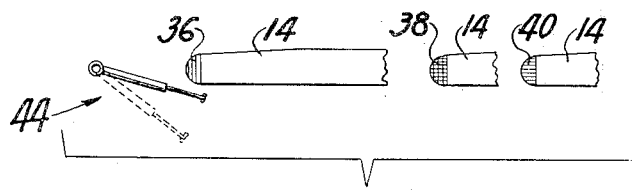
Fig. 2
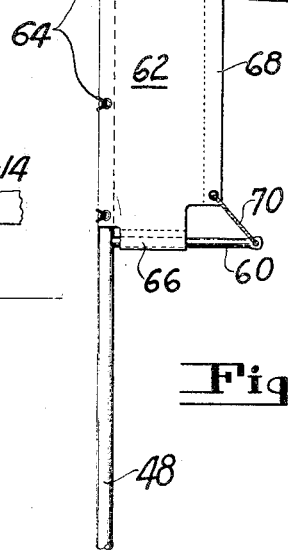
Fig. 3
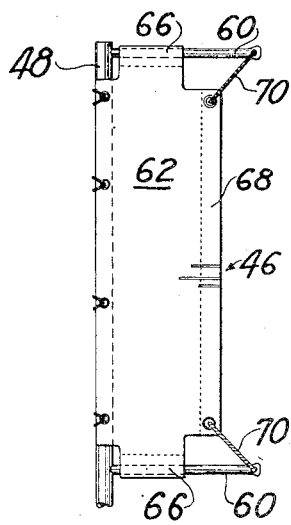
Fig. 4
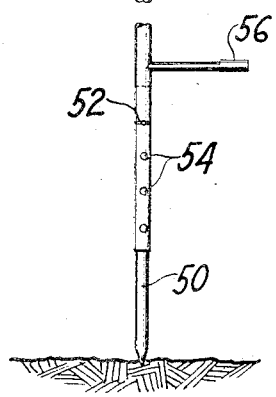
REON B. ROBERTS
INVENTOR
BY *Gifford S. Holmes*
AGENT Patented May 15, 1951

2,552,739

UNITED STATES PATENT OFFICE 2,552,739

METHOD OF TRACKING ROTOR BLADES

Reon B. Roberts, Fairfield, Conn., assignor to United Aircraft Corporation, East Hartford, Conn., a corporation of Delaware Application October 5, 1945, Serial No. 620,468

4 Claims. (Cl. 73—66)

This invention relates to a method for tracking the several blades of a helicopter rotor, or the like, and for ajusting the blades with respect to each other in accordance with the information obtained by tracking. More specifically, the invention comprises an improved method for obtaining markings from the several rotor blades of a helicopter during operation thereof and for adjusting the pitch settings for the several rotor blades in accordance with information obtained from such markings.

An object of this invention is to provide an improved and simplified method of balancing rotor blades with respect to each other.

Another object is to provide an improved tracking method for obtaining information about the relative paths of individual rotor blades in at least one portion of a rotor blade cycle.

Further objects and advantages reside in the steps in tracking and balancing rotor blades to be pointed out more fully in the following specification and shown in the drawings, in which;

Fig. 1 is a diagrammatic view showing only the forward portion of a conventional helicopter;

Fig. 2 is a diagrammatic plan view showing three blade tips, one of which is adjacent a tracking device;

Fig. 3 is an elevational view of the tracking device used in the method; and

Fig. 4 is a detail view of the flag portion of the tracking device with tracking marks thereon.

In helicopters and other rotary wing aircraft, it is important that the several blades rotate within a cone of revolution, and that each blade follows substantially a path on the surface of this cone. In the event that one or more blades rides above or below this cone, a cyclic vibration will occur which will vibrate the rotor shaft and transmit vibrations to the control mechanism and to the craft. For this reason, it is desirable that one blade follow as closely as possible exactly the same path as another.

This invention provides a device for obtaining markings and tracking the several rotor blades so that for a given condition of incidence of all of the blades passing a given point or points, the markings can be taken very carefully with a minimum amount of error. This device and the method of using the same will now be described.

In Fig. 1, a helicopter comprises a body 10 containing an engine, not shown, turning a shaft 12 which in turn rotates rotor blades 14, only two of which show in this figure. It is to be understood that two or more than two rotor blades can be used in this invention without departing from the spirit thereof and herein the invention has been described in connection with a three bladed rotor. A total pitch control lever 16 operates linkages diagrammatically represented at 18 to shift the position of a tiltable plate 20 non-rotatably secured with respect to the body 10 which carries a plate 22 rotatable with the rotor blades 14 and connected thereto by control arms 24 having adjustments 26. A cyclic control arm 30 connects, by linkages diagrammatically shown at 32, to the plate 20 and can tilt the same to provide cyclic pitch for the rotor blades 14 through the above-described linkage. For the details of construction of one such control mechanism, reference may be had to United States Patent No. 2,529,635, issued November 14, 1950.

As best shown in Fig. 2, each of the blades 14 has its tip differently colored; for example, one tip 36 may be red, one tip 38 may be yellow and one tip 40 may be blue for a three-bladed rotor. The tip of the blade may then be marked with chalk, or crayon, or the like, as at 42 as best shown in Fig. 3 adjacent its leading edge with the same color as the tip of the blade.

As the blades rotate with a given pitch setting, a tracking device 44 may be moved into engagement with the colored tips, as shown in Fig. 2, and the chalk mark 42 from each of the three blades 14 can be wiped off onto the marking device as shown at 46 in Fig. 4. If the marks occur at different vertical positions, the blades can be adjusted by the adjustments 26 so that a given control setting in either of the control sticks 16 or 30 will cause the marks 46 to register with each other upon a subsequent operation with substantially the same control setting. To test the blades under several conditions, different settings of the controls may be made and more or less power put into the rotor blades 14.

The improved tracking device 44 comprises a staff 48 mounted upon a rod 50 by a wing nut and bolt 52 which can fit into any of several holes 54 to adjust the height of the upper portion of the device 44. The rod 50 is pointed at its lowermost end for engagement with the ground to ensure accurate tracking of the blades. A handle 56 is provided so that the operator can rotate the staff 48 into the blade tip engaging position shown in solid lines in Fig. 2 from the position shown in dotted lines therein in which the flag will not engage the tips of the blades 14. The upper portion of the device 44 comprises a pair of horizontally extending rods 60 secured to the staff 48. A flag part 62 made up of suitable material such as duck, denim, or canvas, for example, is secured to the staff by lacings 64 and to the rods 60 by looped end portions 66 which are folded back and stitched to the body of the flag 62. The edge of the flag 62 for being marked by the blades 14 is selvaged as at 68. The selvaged edge is maintained in tension by springs or rubber cords 70 fastened to the ends of the selvaged edge 68 and to the ends of the rods 60. Thus, the edge 68 is held taut and the markings 42 will be transferred onto the edge 68 with very little error, if any, due to vibration of the flag 62. As the selvaged edge 68 becomes worn due to long usage, it may be cut off and reselvaged inwardly of the body 62. Thus, the flag may be used until the edge 68 becomes too close to the upper part of the staff 48.

While I have shown and described one means and method for tracking and balancing rotor blades, obviously other arrangements and steps will occur to those skilled in the art. For this reason, I wish to be limited in my invention only by the scope of the following claims.

I claim:

1. The method of adjusting the rotor blades of rotary wing aircraft comprising the steps of, marking each blade with a removable substance having a distinguishing color, operating said blades at a given speed, moving a material into the proximity of the blade paths, permitting said blades to strike said material and transfer said removable substance to said material, and adjusting said blades in accordance with the blade tracking characteristics as indicated by the vertical displacement of the marks transferred to said material by said blades to cause said blades to track on the same path.

2. The method of adjusting the blades of rotary wing aircraft comprising the steps of, marking each blade tip with a removable substance having a distinguishing pigment, rotating said blades, moving a yieldable material into contact with the tips of the rotating blades, and adjusting the pitch setting of said blades in accordance with the blade tracking characteristics as indicated by the vertical displacement of the marks wiped on said material by said blade tips to cause said blades to track the same path.

3. The method of adjusting the blades of rotary wing aircraft comprising the steps of, marking each blade adjacent its tip with a removable substance having a distinguishing pigment, rotating said blades at a given pitch setting, moving a material into contact with the rotating blade tips, and adjusting said blades in accordance with the blade tracking characteristics as indicated by the vertical displacement of the marks wiped on said material by said blade tips to cause said blades to track the same path.

4. The method of adjusting the blades of rotary wing aircraft comprising the steps of, marking each blade adjacent its tip with a removable substance having a distinguishing pigment, rotating said blades at a given speed and with the collective pitch control for the blades at a fixed pitch setting, moving a material into contact with the rotating blade tips, and adjusting the pitch setting of the individual blades in accordance with the blade tracking characteristics as indicated by the vertical displacement of the marks wiped on said material by said blade tips to cause said blades to track the same path.

REON B. ROBERTS.

REFERENCES CITED

The following references are of record in the file of this patent:

UNITED STATES PATENTS

| Number | Name | Date |
|---|---|---|
| 454,072 | Sharples | June 16, 1891 |
| 1,316,260 | Zahm | Sept. 16, 1919 |
| 1,967,080 | Dietze | July 17, 1934 |
| 2,124,547 | DePort | July 26, 1938 |
| 2,343,383 | Martin et al. | Mar. 7, 1944 |
| 2,394,766 | Halford | Feb. 12, 1946 |
| 2,409,537 | Bright | Oct. 15, 1946 |